US010332350B2

(12) United States Patent
Smith et al.

(10) Patent No.: US 10,332,350 B2
(45) Date of Patent: Jun. 25, 2019

(54) GAMING SYSTEM AND METHOD FOR PROVIDING A GROUP EVENT ELIGIBILITY SEQUENCE AND A GROUP EVENT

(71) Applicant: IGT, Las Vegas, NV (US)

(72) Inventors: Vincent P. Smith, Las Vegas, NV (US); Cameron A. Filipour, Las Vegas, NV (US); Mark S. Ross, Las Vegas, NV (US); Joseph Masinter, Las Vegas, NV (US); Shara C. Miller, Oakland, CA (US)

(73) Assignee: IGT, Las Vegas, NV (US)

( * ) Notice: Subject to any disclaimer, the term of this patent is extended or adjusted under 35 U.S.C. 154(b) by 34 days.

(21) Appl. No.: 15/485,965

(22) Filed: Apr. 12, 2017

(65) Prior Publication Data
US 2017/0221310 A1    Aug. 3, 2017

Related U.S. Application Data

(62) Division of application No. 13/626,213, filed on Sep. 25, 2012, now Pat. No. 9,623,321.

(51) Int. Cl.
| | | |
|---|---|---|
| *A63F 13/00* | (2014.01) | |
| *G07F 17/32* | (2006.01) | |
| *A63F 13/45* | (2014.01) | |
| *G07F 17/34* | (2006.01) | |

(52) U.S. Cl.
CPC .......... *G07F 17/3262* (2013.01); *A63F 13/45* (2014.09); *G07F 17/3213* (2013.01); *G07F 17/3227* (2013.01); *G07F 17/3258* (2013.01); *G07F 17/3272* (2013.01); *G07F 17/34* (2013.01)

(58) Field of Classification Search
CPC .. G07F 17/3262; G07F 17/3295; G07F 17/34; G07F 17/3274
See application file for complete search history.

(56) References Cited

U.S. PATENT DOCUMENTS

| | | |
|---|---|---|
| 5,116,055 A | 5/1992 | Tracy |
| 5,344,144 A | 9/1994 | Canon |
| 5,393,057 A | 2/1995 | Marnell |
| 5,417,430 A | 5/1995 | Breeding |
| 5,564,700 A | 10/1996 | Celona |

(Continued)

FOREIGN PATENT DOCUMENTS

| | | |
|---|---|---|
| JP | 2004-229846 A | 8/2004 |
| JP | 2004-229848 A | 8/2004 |

(Continued)

*Primary Examiner* — Omkar A Deodhar
*Assistant Examiner* — Eric M. Thomas
(74) *Attorney, Agent, or Firm* — Neal, Gerber & Eisenberg LLP

(57) ABSTRACT

A gaming system including one or more group event eligibility sequences. Each group event eligibility sequence is associated with a set duration. In these embodiments, if one or more players at one or more gaming machines collectively satisfy a group event eligibility threshold within the set duration of an initiated or triggered group event eligibility sequence, the gaming system determines that such players are eligible to participate in a group event. For the group event, the gaming system provides one or more group event awards to such participating players.

12 Claims, 10 Drawing Sheets

(56) References Cited

U.S. PATENT DOCUMENTS

| | | |
|---|---|---|
| 5,580,309 A | 12/1996 | Piechowiak et al. |
| 5,664,998 A | 9/1997 | Seelig et al. |
| 5,681,040 A | 10/1997 | Peterson |
| 5,752,882 A | 5/1998 | Acres |
| 5,779,544 A | 7/1998 | Seelig et al. |
| 5,876,284 A | 3/1999 | Acres et al. |
| 5,980,384 A | 11/1999 | Barrie |
| 6,033,307 A | 3/2000 | Vancura |
| 6,068,553 A | 5/2000 | Parker |
| 6,089,976 A | 7/2000 | Schneider et al. |
| 6,089,980 A | 7/2000 | Gauselmann |
| 6,110,043 A | 8/2000 | Olsen |
| 6,126,542 A | 10/2000 | Fier |
| 6,142,872 A | 11/2000 | Walker et al. |
| 6,146,273 A | 11/2000 | Olsen |
| 6,190,255 B1 | 2/2001 | Thomas et al. |
| 6,206,782 B1 | 3/2001 | Walker et al. |
| 6,210,275 B1 | 4/2001 | Olsen |
| 6,217,448 B1 | 4/2001 | Olsen |
| 6,231,445 B1 | 5/2001 | Acres |
| 6,238,288 B1 | 5/2001 | Walker et al. |
| 6,309,300 B1 | 10/2001 | Glavich |
| 6,312,332 B1 | 11/2001 | Walker et al. |
| 6,319,122 B1 | 11/2001 | Packes et al. |
| 6,322,309 B1 | 11/2001 | Thomas et al. |
| 6,358,149 B1 | 3/2002 | Schneider et al. |
| 6,361,441 B1 | 3/2002 | Walker et al. |
| 6,364,765 B1 | 4/2002 | Walker et al. |
| 6,364,768 B1 | 4/2002 | Acres et al. |
| 6,375,567 B1 | 4/2002 | Acres |
| 6,375,569 B1 | 4/2002 | Acres |
| 6,416,408 B2 | 7/2002 | Tracy at al. |
| 6,464,584 B2 | 10/2002 | Oliver |
| 6,503,146 B2 | 1/2003 | Walker et al. |
| 6,565,436 B1 | 5/2003 | Baerlocher |
| 6,607,438 B2 | 8/2003 | Baerlocher et al. |
| 6,648,753 B1 | 11/2003 | Tracy et al. |
| 6,652,378 B2 | 11/2003 | Cannon et al. |
| 6,692,353 B2 | 2/2004 | Walker et al. |
| 6,692,354 B2 | 2/2004 | Tracy et al. |
| 6,712,699 B2 | 3/2004 | Walker et al. |
| 6,726,563 B1 | 4/2004 | Baerlocher et al. |
| 6,733,390 B2 | 5/2004 | Jorasch et al. |
| 6,743,096 B2 | 6/2004 | Allendorf et al. |
| 6,780,105 B1 | 8/2004 | Kaminkow |
| 6,786,824 B2 | 9/2004 | Cannon |
| 6,814,664 B2 | 11/2004 | Baerlocher et al. |
| 6,832,958 B2 | 12/2004 | Acres et al. |
| 6,843,724 B2 | 1/2005 | Walker et al. |
| 6,869,361 B2 | 3/2005 | Sharpless et al. |
| 6,887,154 B1 | 5/2005 | Luciano, Jr. et al. |
| 6,899,625 B2 | 5/2005 | Luciano, Jr. et al. |
| 6,984,174 B2 | 1/2006 | Cannon et al. |
| 7,008,319 B2 | 3/2006 | Montgomery et al. |
| 7,033,270 B2 | 4/2006 | Baerlocher et al. |
| 7,048,628 B2 | 5/2006 | Schneider |
| 7,086,950 B2 | 8/2006 | Gordon et al. |
| 7,121,943 B2 | 10/2006 | Webb et al. |
| 7,223,172 B2 | 5/2007 | Baerlocher et al. |
| 7,297,059 B2 | 11/2007 | Vancura et al. |
| 7,300,351 B2 | 11/2007 | Thomas |
| 7,311,598 B2 | 12/2007 | Kaminkow et al. |
| 7,311,604 B2 | 12/2007 | Kaminkow et al. |
| 7,351,140 B2 | 4/2008 | Wolf et al. |
| 7,364,510 B2 | 4/2008 | Walker et al. |
| 7,416,484 B1 | 8/2008 | Nelson et al. |
| 7,427,236 B2 | 9/2008 | Kaminkow et al. |
| 7,448,949 B2 | 11/2008 | Kaminkow et al. |
| 7,452,270 B2 | 11/2008 | Walker et al. |
| 7,465,226 B2 | 12/2008 | Ikeya et al. |
| 7,470,187 B2 | 12/2008 | Baerlocher et al. |
| 7,470,188 B2 | 12/2008 | Baerlocher et al. |
| 7,470,189 B2 | 12/2008 | Baerlocher et al. |
| 7,470,190 B2 | 12/2008 | Baerlocher et al. |
| 7,481,430 B1 | 1/2009 | Jackson et al. |
| 7,785,194 B2 | 8/2010 | Schneider et al. |
| 7,976,389 B2 | 7/2011 | Cannon et al. |
| 8,162,666 B2 | 4/2012 | Parham |
| 2001/0034260 A1 | 10/2001 | Luciano, Jr. et al. |
| 2002/0132660 A1 | 9/2002 | Taylor |
| 2002/0142844 A1 | 10/2002 | Kerr |
| 2002/0160826 A1 | 10/2002 | Gomez et al. |
| 2002/0177483 A1 | 11/2002 | Cannon |
| 2003/0060264 A1 | 3/2003 | Chilton et al. |
| 2003/0064768 A1 | 4/2003 | Fier |
| 2003/0069058 A1 | 4/2003 | Byrne |
| 2003/0078091 A1 | 4/2003 | Brandstetter et al. |
| 2003/0078101 A1 | 4/2003 | Schneider et al. |
| 2003/0100361 A1 | 5/2003 | Sharpless et al. |
| 2003/0119581 A1 | 6/2003 | Cannon et al. |
| 2003/0186733 A1 | 10/2003 | Wolf et al. |
| 2003/0190941 A1 | 10/2003 | Byrne |
| 2003/0199306 A1 | 10/2003 | Parker |
| 2003/0199308 A1 | 10/2003 | Parker |
| 2003/0224852 A1 | 12/2003 | Walker et al. |
| 2004/0053664 A1 | 3/2004 | Byrne |
| 2004/0053681 A1 | 3/2004 | Jordan et al. |
| 2004/0102238 A1 | 5/2004 | Taylor |
| 2004/0242320 A1 | 12/2004 | Jackson |
| 2005/0043082 A1 | 2/2005 | Peterson et al. |
| 2005/0101384 A1 | 5/2005 | Parham |
| 2005/0187014 A1 | 8/2005 | Saffari et al. |
| 2005/0218590 A1 | 10/2005 | O'Halloran et al. |
| 2006/0025195 A1 | 2/2006 | Pennington et al. |
| 2006/0025203 A1 | 2/2006 | Thomas |
| 2006/0040723 A1 | 2/2006 | Baerlocher et al. |
| 2006/0040732 A1 | 2/2006 | Baerlocher et al. |
| 2006/0040733 A1 | 2/2006 | Baerlocher et al. |
| 2006/0040734 A1 | 2/2006 | Baerlocher et al. |
| 2006/0040736 A1 | 2/2006 | Baerlocher et al. |
| 2006/0046821 A1 | 3/2006 | Kaminkow et al. |
| 2006/0046822 A1 | 3/2006 | Kaminkow et al. |
| 2006/0046823 A1 | 3/2006 | Kaminkow et al. |
| 2006/0068876 A1 | 3/2006 | Kane et al. |
| 2006/0073897 A1 | 4/2006 | Englman et al. |
| 2006/0084499 A1 | 4/2006 | Moshal |
| 2006/0100019 A1 | 5/2006 | Hornik et al. |
| 2006/0111178 A1 | 5/2006 | Gallaway et al. |
| 2006/0135243 A1 | 6/2006 | Englman et al. |
| 2006/0189376 A1 | 8/2006 | Hornik et al. |
| 2006/0211472 A1 | 9/2006 | Walker et al. |
| 2006/0252481 A1 | 11/2006 | Schmit |
| 2006/0287043 A1 | 12/2006 | Englman et al. |
| 2007/0015584 A1 | 1/2007 | Frankel |
| 2007/0054732 A1 | 3/2007 | Baerlocher |
| 2007/0054733 A1 | 3/2007 | Baerlocher et al. |
| 2007/0060317 A1 | 3/2007 | Martin |
| 2007/0060329 A1 | 3/2007 | Martin |
| 2007/0060330 A1 | 3/2007 | Martin |
| 2007/0060369 A1 | 3/2007 | Martin |
| 2007/0077990 A1 | 4/2007 | Cuddy et al. |
| 2007/0105619 A1 | 5/2007 | Kniestead et al. |
| 2007/0105620 A1 | 5/2007 | Cuddy et al. |
| 2007/0123341 A1 | 5/2007 | Tessmer et al. |
| 2007/0149292 A1 | 6/2007 | Kaminkow et al. |
| 2007/0155465 A1 | 7/2007 | Walker et al. |
| 2007/0155485 A1 | 7/2007 | Cuddy et al. |
| 2007/0167217 A1 | 7/2007 | Macvittie et al. |
| 2008/0020817 A1 | 1/2008 | Kaminkow et al. |
| 2008/0020822 A1 | 1/2008 | Cuddy et al. |
| 2008/0020823 A1 | 1/2008 | Cuddy et al. |
| 2008/0020824 A1 | 1/2008 | Cuddy et al. |
| 2008/0020825 A1 | 1/2008 | Cuddy et al. |
| 2008/0020829 A1 | 1/2008 | Baerlocher |
| 2008/0020847 A1 | 1/2008 | Kniestedt et al. |
| 2008/0039194 A1 | 2/2008 | Walther et al. |
| 2008/0045341 A1 | 2/2008 | Englman |
| 2008/0051168 A1 | 2/2008 | Kaminkow et al. |
| 2008/0070676 A1 | 3/2008 | Baerlocher et al. |
| 2008/0070677 A1 | 3/2008 | Baerlocher et al. |
| 2008/0070678 A1 | 3/2008 | Baerlocher et al. |
| 2008/0070702 A1 | 3/2008 | Kaminkow et al. |
| 2008/0076527 A1 | 3/2008 | Low et al. |
| 2008/0081690 A1 | 4/2008 | Baerlocher et al. |

(56) References Cited

U.S. PATENT DOCUMENTS

| | | |
|---|---|---|
| 2008/0081691 A1 | 4/2008 | Baerlocher et al. |
| 2008/0102916 A1 | 5/2008 | Kovacs et al. |
| 2008/0102920 A1 | 5/2008 | Baerlocher et al. |
| 2008/0108401 A1 | 5/2008 | Baerlocher et al. |
| 2008/0108429 A1 | 5/2008 | Davis et al. |
| 2008/0113765 A1 | 5/2008 | DeWaal |
| 2008/0113768 A1 | 5/2008 | Baerlocher |
| 2008/0113771 A1 | 5/2008 | Baerlocher et al. |
| 2008/0119283 A1 | 5/2008 | Baerlocher |
| 2008/0139274 A1 | 6/2008 | Baerlocher et al. |
| 2008/0139290 A1 | 6/2008 | Kniesteadt et al. |
| 2008/0153564 A1 | 6/2008 | Baerlocher et al. |
| 2008/0161105 A1 | 7/2008 | Mishra |
| 2008/0176650 A1 | 7/2008 | Wolf et al. |
| 2008/0188296 A1 | 8/2008 | Seelig et al. |
| 2008/0188298 A1 | 8/2008 | Seelig et al. |
| 2008/0200239 A1 | 8/2008 | Gilmore et al. |
| 2008/0293481 A1 | 11/2008 | Davies |
| 2009/0036202 A1 | 2/2009 | Baerlocher et al. |
| 2009/0042644 A1 | 2/2009 | Zielinski |
| 2009/0042645 A1 | 2/2009 | Graham et al. |
| 2009/0117970 A1* | 5/2009 | De Waal .............. G07F 17/32 463/20 |
| 2009/0124320 A1 | 5/2009 | DeWaal |
| 2009/0275410 A1 | 11/2009 | Kisenwether et al. |
| 2010/0120494 A1 | 5/2010 | DeWaal et al. |
| 2010/0197379 A1 | 8/2010 | Cannon |
| 2014/0087840 A1* | 3/2014 | Smith .............. G07F 17/3258 463/25 |

FOREIGN PATENT DOCUMENTS

| | | |
|---|---|---|
| WO | WO 2005/082480 | 9/2005 |
| WO | WO 2006/005073 | 1/2006 |
| WO | WO 2007/030733 | 3/2007 |
| WO | WO 2007/033000 | 3/2007 |
| WO | WO 2007/040674 | 4/2007 |
| WO | WO 2007/127259 | 11/2007 |
| WO | WO 2008/021449 | 2/2008 |
| WO | WO 2008/024330 | 2/2008 |
| WO | WO 2008/045398 | 4/2008 |
| WO | WO 2008/048634 | 4/2008 |
| WO | WO 2008/051796 | 5/2008 |
| WO | WO 2008/060978 | 5/2008 |

* cited by examiner

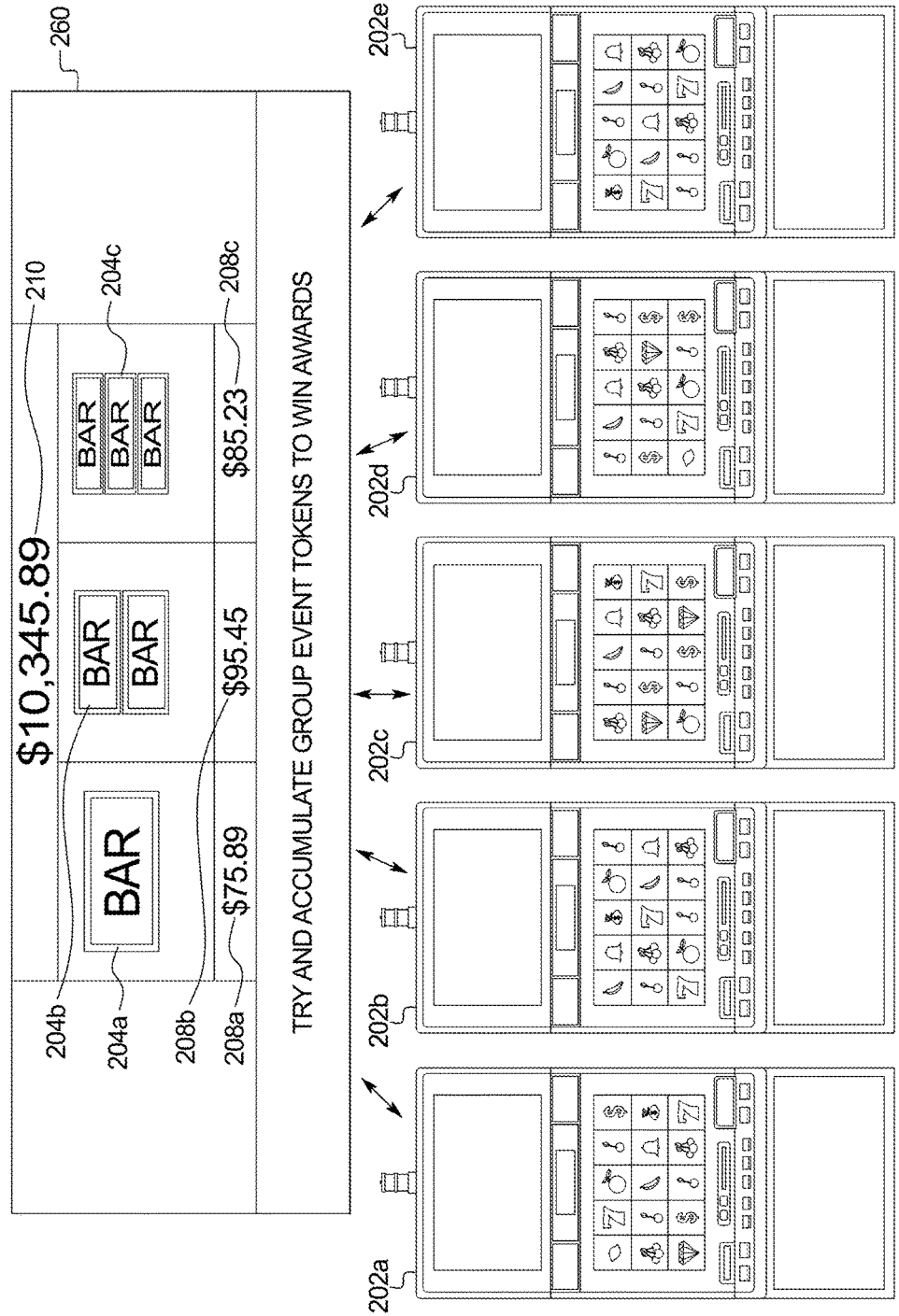

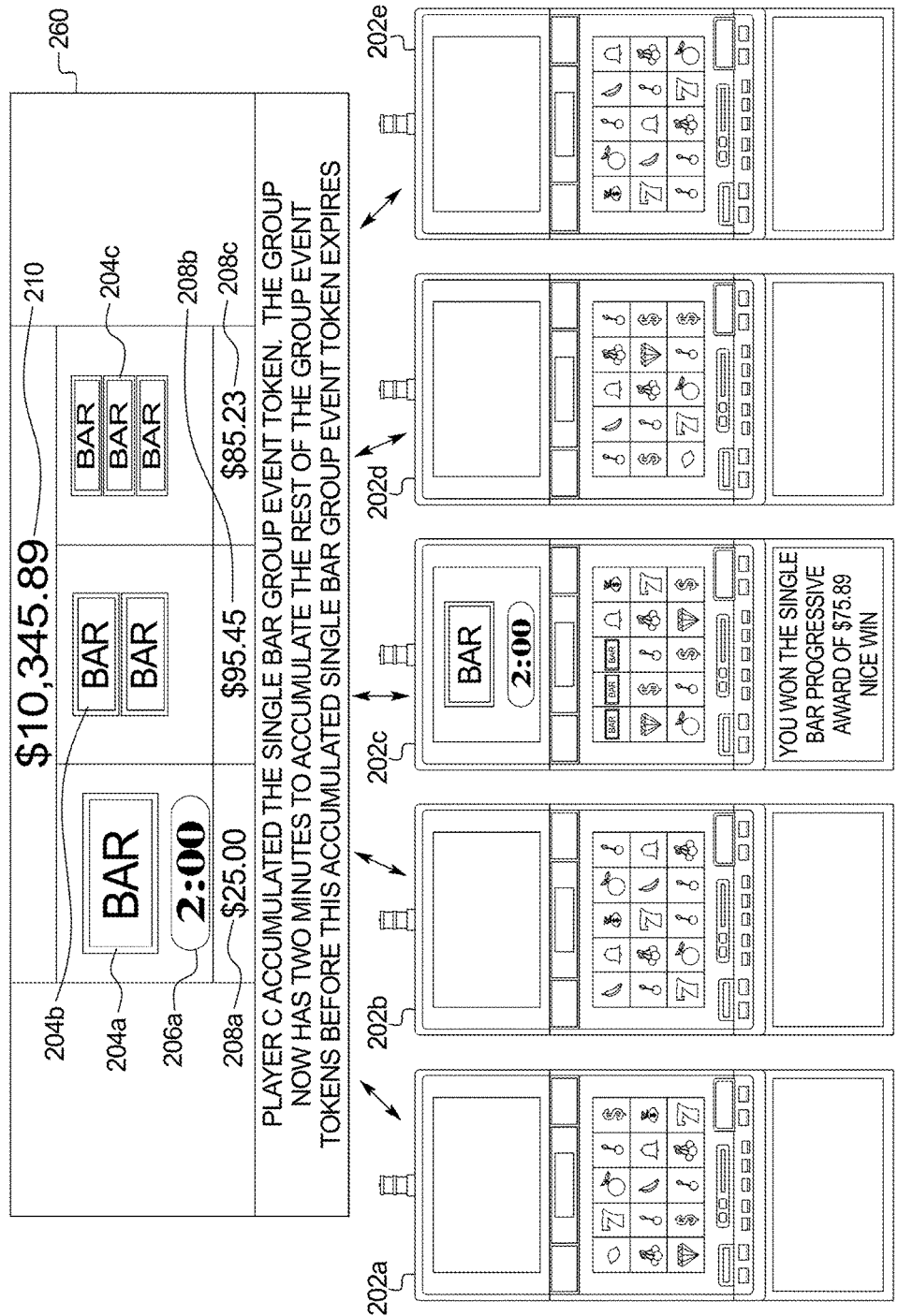

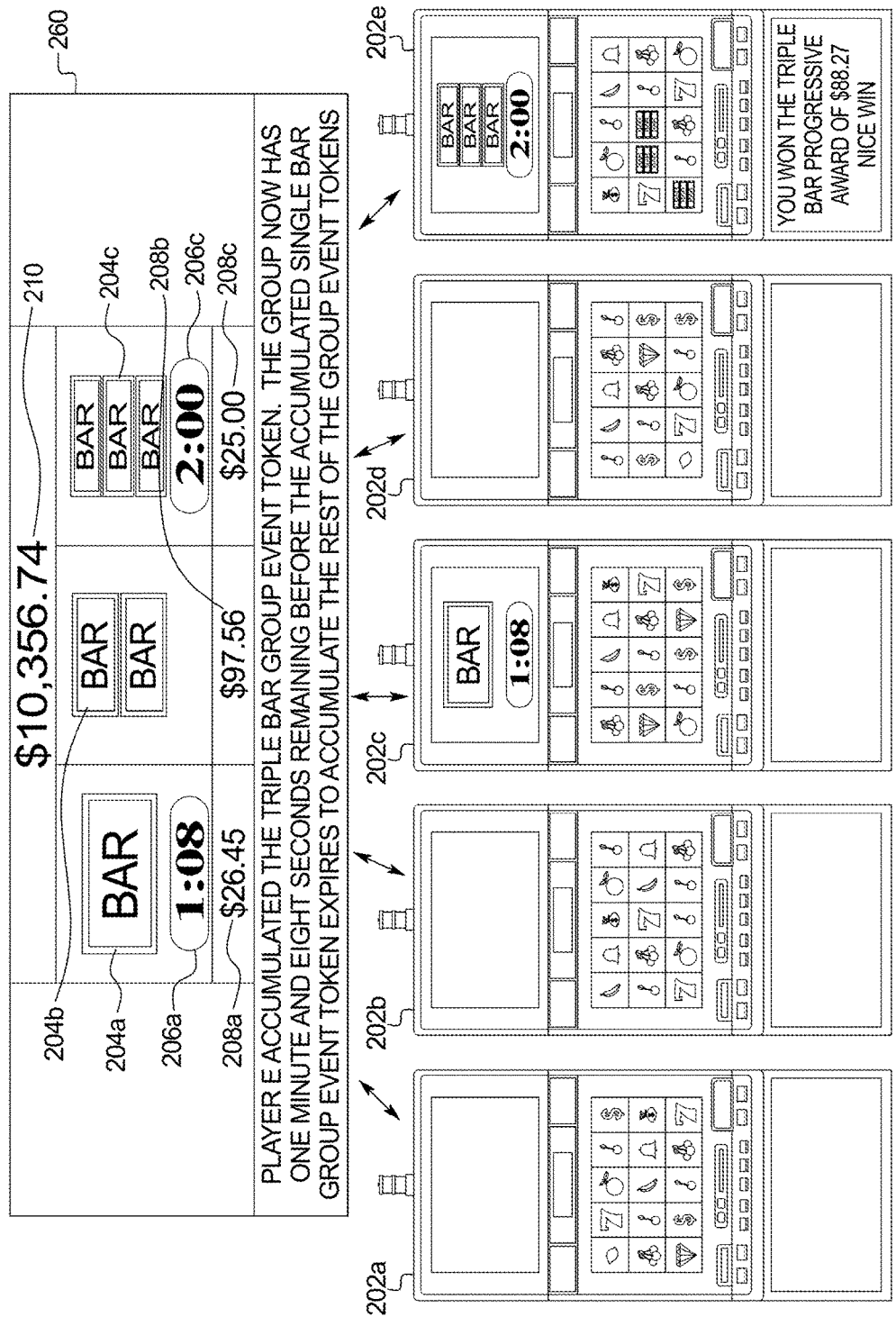

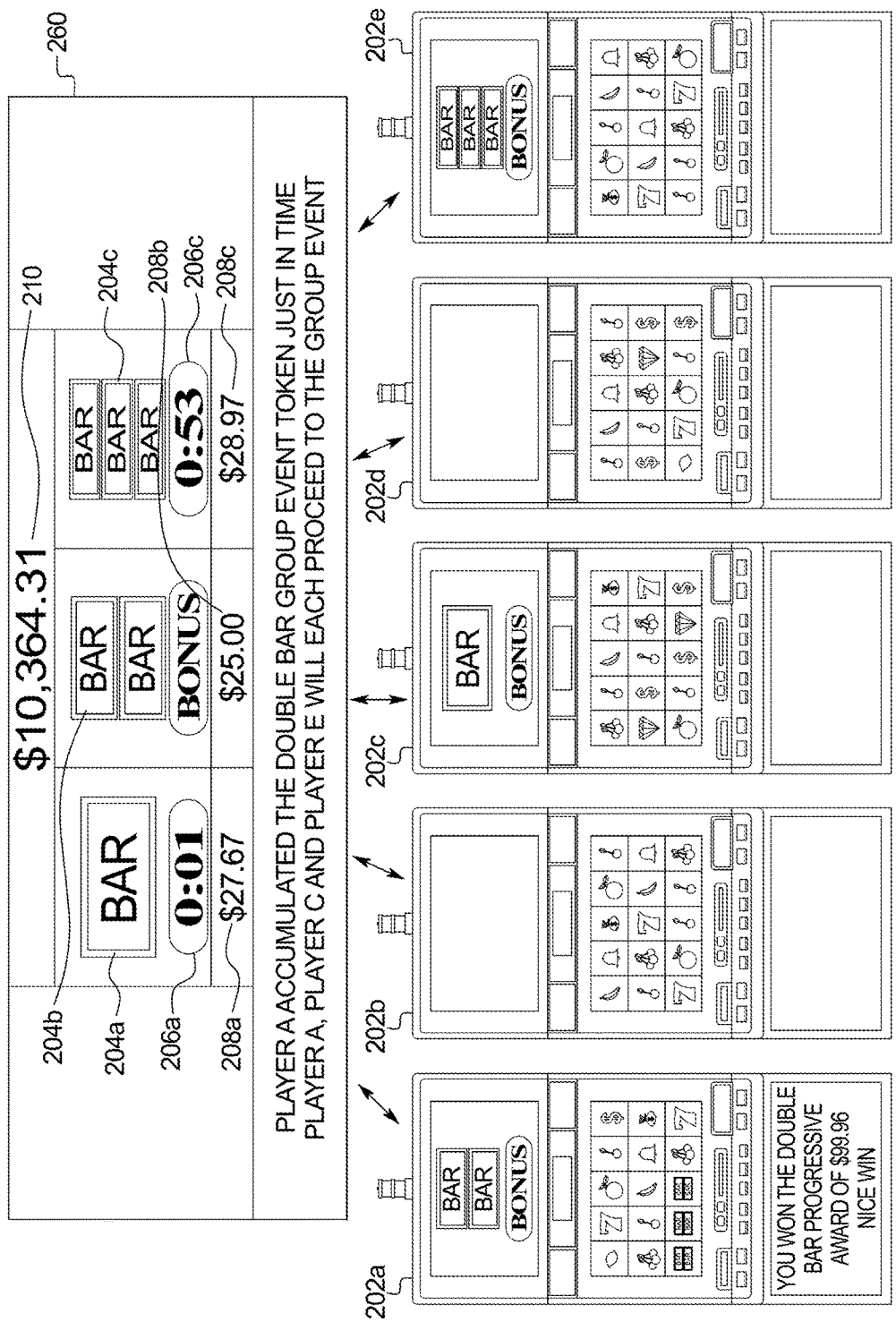

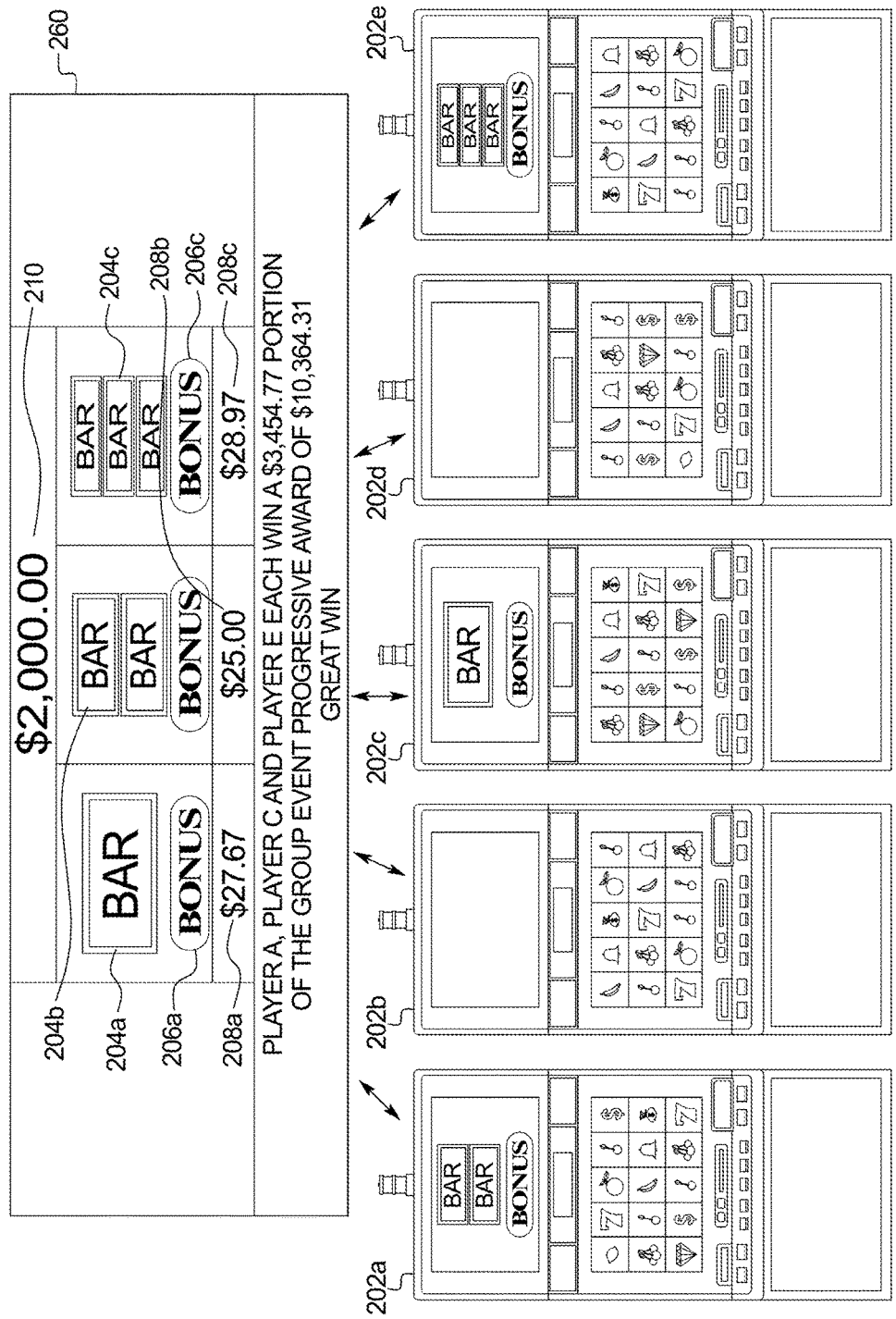

GAMING SYSTEM AND METHOD FOR PROVIDING A GROUP EVENT ELIGIBILITY SEQUENCE AND A GROUP EVENT

PRIORITY CLAIM

This application is a divisional of, claims priority to and the benefit of U.S. patent application Ser. No. 13/626,213, filed on Sep. 25, 2012, the entire contents of which are incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known secondary or bonus games include a group gaming aspect wherein a plurality of players participate in a group event for one or more bonus awards, such as progressive awards. Certain known gaming machines are configured such that the players of these gaming machines compete for one or more awards. Other known gaming machines are configured such that the players share with each other or can each win one or more awards. These awards are sometimes displayed by one or more secondary display devices above the bank or group of gaming machines.

These types of group or community gaming systems (where the players are competing for awards, where the players are sharing awards, or where the players are winning awards at the same time) continue to grow in popularity. Certain of these group or community gaming systems create an aura of excitement and entertainment for the people playing the gaming machines and for people watching play. There is a continuing need to provide new and different gaming machines and gaming systems which excite and entertain players.

SUMMARY

The present disclosure relates generally to gaming systems and methods for providing a group event eligibility sequence and a group event.

In various embodiments, the gaming system disclosed herein includes one or more group event eligibility sequences. Each group event eligibility sequence is associated with a set duration. In these embodiments, if one or more players at one or more gaming machines collectively satisfy a group event eligibility threshold within the set duration of an initiated or triggered group event eligibility sequence, the gaming system determines that such players are eligible to participate in a group event. For the group event, the gaming system provides one or more group event awards to such participating players.

In certain embodiments, the gaming system disclosed herein enables one or more players to play one or more primary games. In association with the plays of the primary games, the gaming system causes zero, one or more of the players to accumulate zero, one or more of a plurality of different group event eligibility units, such as different game elements generated in such primary games. Each group event eligibility unit is associated with a set duration, such as an amount of time or a quantity of games played, before that group event eligibility unit expires.

In these embodiments, upon the accumulation of one of a plurality of different group event eligibility units, the gaming system begins to run, lapse or incrementally modify the set duration associated with that accumulated group event eligibility unit. That is, upon a group event eligibility unit accumulation event, the gaming system initiates a group event eligibility sequence for the duration associated with the group event eligibility unit accumulation event which occurred. For example, if the gaming system randomly generates a first designated symbol (i.e., a first group event eligibility unit) in a play of a game, the gaming system accumulates that first designated symbol and begins counting down a timer from a set duration of five minutes associated with the generated first designated symbol.

In one embodiment, in addition to initiating a group event eligibility sequence in association with the accumulated group event eligibility unit, the gaming system provides the player associated with the accumulation of the group event eligibility unit an award associated with the accumulated group event eligibility unit. For example, each individual group event eligibility unit is associated with a different progressive award wherein upon each individual group event eligibility unit being accumulated, the gaming system provides the associated progressive award to a player and resets the provided progressive award to a base or reset amount.

Following the initiation of the group event eligibility sequence and in conjunction with the running of the duration associated with the accumulated group event eligibility unit, the gaming system continues enabling one or more players to accumulate zero, one or more of the different group event eligibility units. In such embodiments, as the duration associated with one or more accumulated group event eligibility units approach expiration, certain players experience a greater feeling of excitement and anticipation as these players frantically attempt to satisfy the group event eligibility threshold.

If the players fail to collectively accumulate a designated quantity of the different group event eligibility units within the set duration associated with one of the accumulated group event eligibility units, the gaming system removes or otherwise eliminates that accumulated group event eligibility unit. In other words, if a group event eligibility threshold (i.e., one or more players collectively accumulating the designated quantity of the different group event eligibility units) is not reached or satisfied within the set duration of an individual group event eligibility sequence, the gaming system discards the accumulated group event eligibility unit which triggered the initiation of that individual group event eligibility sequence. Put differently, upon the occurrence of a group event eligibility unit expiration event associated with a previously accumulated group event eligibility unit, the gaming system eliminates that previously accumulated the group event eligibility unit. Continuing with the above example, if the group event eligibility threshold includes collectively accumulating five different symbols and the players fail to collectively accumulate the five different symbols during the five minute duration associated with the accumulated first symbol, the gaming system removes or eliminates the accumulated first symbol from the set of accumulated symbols. It should be appreciated that in certain embodiments, the removal or elimination of one group event eligibility unit (upon the conclusion of the duration associated with that accumulated group event eligibility unit) does not affect any other currently accumulated group event eligibility units nor any running durations associated with such other currently accumulated group event eligibility units.

On the other hand, if one or more players concurrently accumulate the designated quantity of the different group event eligibility units within the set duration associated with each of the currently accumulated group event eligibility units, the gaming system enables the players having currently accumulated group event eligibility units to participate in a group event. The gaming system then provides a group event award to such players. That is, if the group event eligibility threshold is reached prior to the durations of each of the currently accumulated group event eligibility units lapsing (and thus prior to such group event eligibility units being eliminated), the gaming system triggers a group bonus event for the players which accumulated such non-eliminated gaming elements. Such embodiments create an aura of excitement and entertainment for certain players because such players cooperate to accumulate group event eligibility units and benefit from the collective accumulation of such group event eligibility units within a set duration. Continuing alternatively with the above example, if the group event eligibility threshold includes collectively accumulating five game symbols and three players concurrently accumulate the five different symbols during the five minute duration associated with the accumulated first symbol (and the durations associated with the four other accumulated symbols have not lapsed), the gaming system causes these three players to each participate in a group event and further provides a group event award to each of these three participating players.

It should be appreciated that in certain embodiments, upon each accumulation of each group event eligibility unit (occurring before, after or during the running of the set duration associated with a previously accumulated group event eligibility unit), the gaming system begins to run or lapse the set duration associated with that accumulated group event eligibility unit (i.e., the gaming system initiates another group event eligibility sequence). Accordingly, if a plurality of group event eligibility units are accumulated at different points in time, different durations associated with different accumulated group event eligibility units are concurrently running (and thus different group event eligibility sequences are concurrently occurring). Thus, even if one duration associated with one accumulated group event eligibility unit expires (and thus that accumulated group event eligibility unit is eliminated), one or more other durations associated with one or more other accumulated group event eligibility units may be pending with a partially satisfied group event eligibility threshold. Such a configuration of having multiple concurrently running group event eligibility sequences combats any group event eligibility fatigue which may occur upon the conclusion of a failed group event eligibility sequence while players await for another group event eligibility sequence to be initiated.

Additional features and advantages are described in, and will be apparent from, the following Detailed Description and the figures.

BRIEF DESCRIPTION OF THE FIGURES

FIGS. 2A, 2B, 2C, 2D and 2E are front views of one embodiment of the gaming system disclosed herein illustrating a successful completion of a group event eligibility sequence and a corresponding group event.

DETAILED DESCRIPTION

Figure 1:
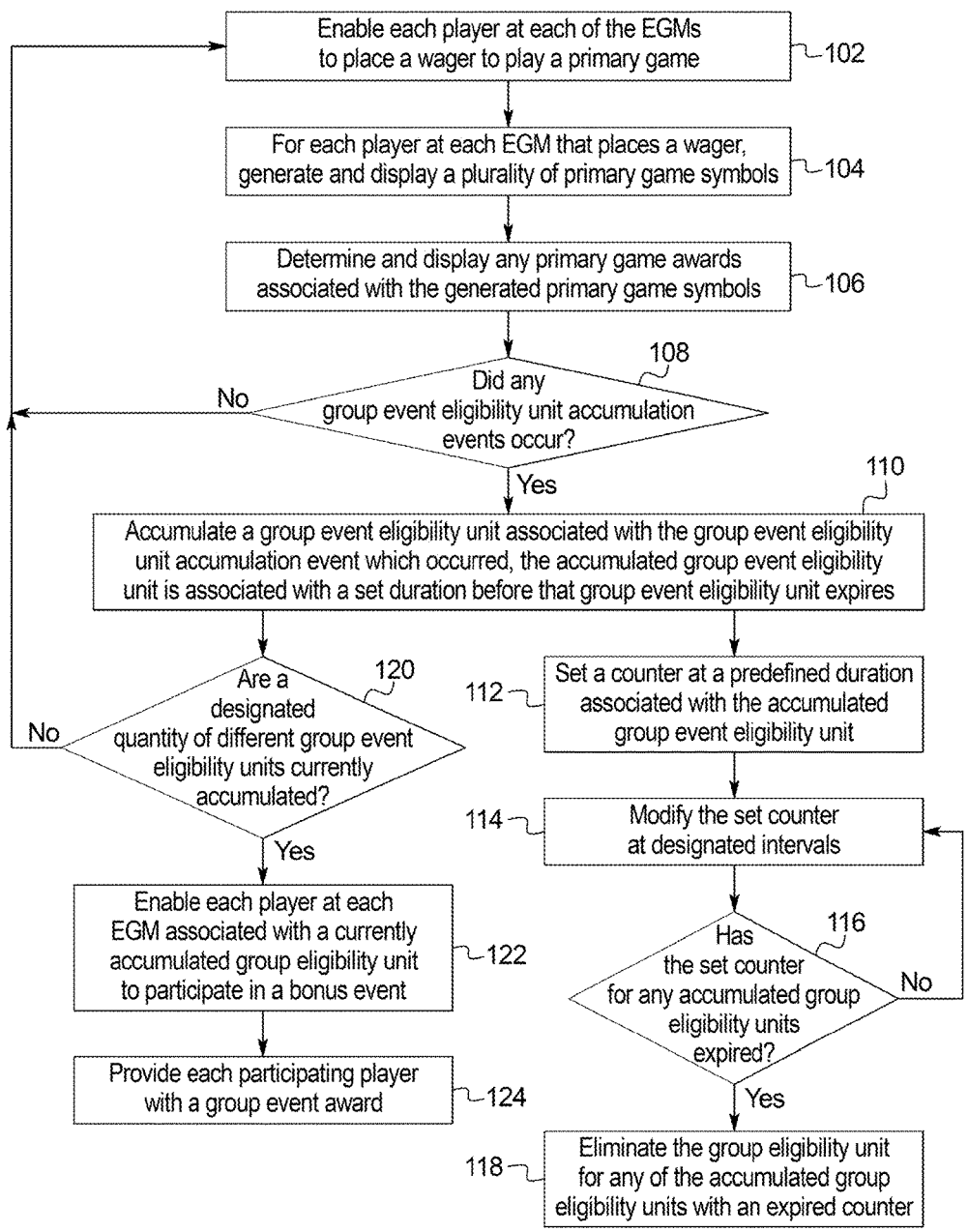
FIG. 1 is a flow chart an example process for operating a gaming system providing one embodiment of a group event eligibility sequence disclosed herein.

Group Event Eligibility Sequence and Group Event

In various embodiments, the gaming system disclosed herein includes one or more group event eligibility sequences. Each group event eligibility sequence is associated with a set duration, such as an amount of time or a quantity of games played. In these embodiments, if one or more players at one or more gaming machines collectively satisfy a group event eligibility threshold within the set duration of an initiated or triggered group event eligibility sequence, the gaming system determines that such players are eligible to participate in a group event. For the group event, the gaming system provides one or more group event awards to such participating players.

While certain of the embodiments described below are directed to triggering a group event eligibility sequence and any associated group event as a secondary or bonus game, it should be appreciated that the present disclosure may additionally or alternatively be employed in association with determining which player's participate in one or more plays of a primary or base wagering group event. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, the gaming system enables each player at each of a plurality of EGMs to place a wager to play a primary game as indicated in block 102 of FIG. 1.

For each player at each of the EGMs that places a wager, the gaming system generates and displays a plurality of primary game symbols as indicated in block 104. The gaming system then determines and displays any primary game awards associated with the generated primary game symbols as indicated in block 106.

For example, as seen in FIG. 2A, the gaming system: (i) enables a first player (i.e., Player A) to wager on and play a primary game of a first EGM 202*a*; (ii) enables a second player (i.e., Player B) to wager on and play a primary game of a second EGM 202*b*; (iii) enables a third player (i.e., Player C) to wager on and play a primary game of a third EGM 202*c*; (iv) enables a fourth player (i.e., Player D) to wager on and play a primary game of a fourth EGM 202*d*; and (v) enables a fifth player (i.e., Player E) to wager on and play a primary game of a fifth EGM 202*e*. In this example, the gaming system provides appropriate messages such as "TRY AND ACCUMULATE GROUP EVENT TOKENS TO WIN AWARDS" to one or more players visually, or through suitable audio or audiovisual displays, such as community display device 260.

In different embodiments, one or more of the primary games (which generated one or more primary game symbols) played by one or more of the EGMs include, but are not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, or a play of any other suitable type of game.

In addition to determining any primary game awards associated with the generated primary game symbols for each wagered on primary game, the gaming system determines if any group event eligibility unit accumulation events occur as indicated in diamond 108 of FIG. 1. In one embodiment, a group event eligibility unit accumulation event occurs based on a displayed event associated with a play of a game. In one such embodiment, a group event eligibility unit includes a game element of a play of a game, such as a designated primary game symbol (or a designated primary game symbol combination). In this embodiment, the gaming system determines if a group event eligibility unit accumulation event occurs by determining if the designated primary game symbol (or the designated primary game symbol combination) was generated in association with the play of the primary game.

If the gaming system determines that no group event eligibility unit accumulation event occurred in association with any of the wagered on plays of the primary games, the gaming system returns to block 102 and proceeds as described above with enabling the placement of additional wagers on addition plays of the primary games.

On the other hand, if the gaming system determines that at least one group event eligibility unit accumulation event occurred, as indicated in block 110, the gaming system accumulates a group event eligibility unit associated with the group event eligibility unit accumulation event which occurred. As further indicated in block 110, the accumulated group event eligibility unit is associated with a set duration before that group event eligibility unit expires or lapses. In one such embodiment, the set duration associated with an accumulated group event eligibility unit includes an amount of time before that group event eligibility unit expires or lapses. In another such embodiment, the set duration associated with an accumulated group event eligibility unit includes a quantity of games played before that group event eligibility unit expires or lapses. In another such embodiment, the set duration associated with an accumulated group event eligibility unit includes a quantity of occurrence of any traceable event (which occurs either in association with one or more games played or independent of one or more games played) before that group event eligibility unit expires or lapses.

For example, as seen in FIG. 2B, in association with the third EGM 202c generating the single bar—single bar—single bar symbol combination, the gaming system accumulates the single bar symbol group event eligibility unit which is illustrated as the single bar symbol group event token 204a. As further seen in FIG. 2B, the accumulated single bar symbol group event token is associated with a duration of two minutes 206a (which, as described below, the gaming system begins counting down from). In this example, the gaming system provides appropriate messages such as "PLAYER C ACCUMULATED THE SINGLE BAR GROUP EVENT TOKEN" and "THE GROUP NOW HAS TWO MINUTES TO ACCUMULATE THE REST OF THE GROUP EVENT TOKENS BEFORE THIS ACCUMULATED SINGLE BAR GROUP EVENT TOKEN EXPIRES" to one or more players visually, or through suitable audio or audiovisual displays, such as community display device 260.

In one embodiment, in addition to being associated with a set duration, one or more group event eligibility units are associated with a group event eligibility unit award, such as a progressive award. In this embodiment, if the gaming system accumulates a group event eligibility unit in association with a player, the gaming system also provides the player the group event eligibility unit award associated with the accumulated group event eligibility unit. For example, as seen in FIG. 2A, each of the three available group event eligibility units is associated with a separate progressive award. In this example: (i) the single bar symbol group event eligibility unit 204a is associated with a first progressive award 208a currently valued at $75.89; (ii) the double bar symbol group event eligibility unit 204b is associated with a second progressive award 208b currently valued at $95.45; and (iii) the triple bar symbol group event eligibility unit 204c is associated with a third progressive award 208c currently valued at $85.23. As seen in FIG. 2B, in association with the third EGM 202c causing an accumulation of the single bar symbol group event eligibility unit (as a result of generating the single bar—single bar—single bar symbol combination), the gaming system provides the first progressive award 208a of $75.89 to the third player of the third EGM 202c. As further seen in FIG. 2B, the gaming system resets this first progressive award to a reset or base amount of $25.00. In this example, the gaming system provides appropriate messages such as "YOU WON THE SINGLE BAR PROGRESSIVE AWARD OF $75.89" and "NICE WIN" to one or more players visually, or through suitable audio or audiovisual displays.

In association with the accumulation of a group event eligibility unit, the gaming system further sets a counter, meter or timer at a predefined duration associated with the accumulated group event eligibility unit as indicated in block 112. The gaming system then modifies the set counter at designated intervals as indicated in block 114. In other words, upon the accumulation of a group event eligibility unit, the gaming system begins to run, lapse or incrementally modify the set duration associated with that accumulated group event eligibility unit. Put differently, upon a group event eligibility unit accumulation event, the gaming system initiates a group event eligibility sequence for the duration associated with the group event eligibility unit accumulation event which occurred. In one such embodiment wherein the set duration associated with an accumulated group event eligibility unit includes an amount of time, the gaming system modifies the set counter at designated time intervals. In another such embodiment wherein the set duration associated with an accumulated group event eligibility unit includes a quantity of games played, the gaming system modifies the set counter at designated intervals based on one or more games played. In another such embodiment wherein the set duration associated with an accumulated group event eligibility unit includes a quantity of occurrence of any traceable event, the gaming system modifies the set counter at designated intervals based on such occurrences of these traceable events.

Following the setting of the counter for the accumulated group event eligibility unit and the periodic modification to the set counter, at designated intervals the gaming system determines if the set counter, meter or timer for any accumulated group eligibility units has lapsed or expired as indicated in diamond 116. In one such embodiment wherein the set duration associated with an accumulated group event eligibility unit includes an amount of time, the gaming system determines whether the amount of time has expired or lapsed. In another such embodiment wherein the set duration associated with an accumulated group event eligibility unit includes a quantity of games played, the gaming system determines if the quantity of games have been played. In another such embodiment wherein the set duration associated with an accumulated group event eligibility unit includes a quantity of occurrence of any traceable event, the gaming system determines whether the quantity of such traceable events have occurred.

If the set counter for any of the accumulated group eligibility units has lapsed, the gaming system eliminates, discards or otherwise deems not currently accumulated that group eligibility unit as indicated in block 118. That is, if the players fail to collectively accumulate a designated quantity of the different group event eligibility units within the set duration associated with one of the accumulated group event eligibility units, the gaming system removes or otherwise eliminates that accumulated group event eligibility unit. In other words, if a group event eligibility threshold (i.e., one or more players collectively accumulating the designated quantity of the different group event eligibility units) is not reached or satisfied within the set duration of an individual group event eligibility sequence, the gaming system discards the accumulated group event eligibility unit which triggered the initiation of that individual group event eligibility sequence. It should be appreciated that in certain embodiments, the removal or elimination of one group event eligibility unit (upon the conclusion of the duration associated with that accumulated group event eligibility unit) does not affect any other currently accumulated group event eligibility units nor any running durations associated with such other currently accumulated group event eligibility units. It should be further appreciated that as one or more counters approach expiring, certain players experience a greater feeling of excitement and anticipation as these players frantically attempt to satisfy the group event eligibility threshold.

On the other hand, if the set counter has not lapsed, the gaming system returns to block 114 and proceeds as described above. That is, if the gaming system determines that the set counter, meter or timer (for an individually accumulated group eligibility unit) has any remaining duration to enable the players of the EGMs to reach or satisfy a group event eligibility threshold, the gaming system continues monitoring the duration of such accumulated group event eligibility units for any expiration.

Following the accumulation of a group event eligibility unit (and concurrent with the periodic group event eligibility unit counter modifications and potential elimination of any previously accumulated group event eligibility units), the gaming system determines if a designated quantity of different group event eligibility units are currently accumulated as indicated in diamond 120 of FIG. 1. Put differently, the gaming system determines if a group event eligibility threshold (i.e., one or more players collectively accumulating the designated quantity of the different group event eligibility units) is reached or satisfied within the set duration of an individual group event eligibility sequence.

If the gaming system determines that the designated quantity of different group eligibility units are not currently accumulated, the gaming system returns to block 102 and proceeds as described above with enabling the placement of additional wagers on addition plays of the primary games.

For example, as seen in FIG. 2C, during the duration of the two-minutes associated with the accumulated single bar symbol group eligibility unit, in association with the fifth EGM 202e generating the triple bar—triple bar —triple bar symbol combination, the gaming system accumulates the triple bar symbol group event eligibility unit which is illustrated as the triple bar symbol group event token 204c. As further seen in FIG. 2C, the accumulated triple bar symbol group event token is also associated with a duration of two minutes 208c which the gaming system begins counting down from. In this example, the gaming system provides appropriate messages such as "PLAYER E ACCUMULATED THE TRIPLE BAR GROUP EVENT TOKEN. THE GROUP NOW HAS ONE MINUTE AND EIGHT SECONDS REMAINING BEFORE THE ACCUMULATED SINGLE BAR GROUP EVENT TOKEN EXPIRES TO ACCUMULATE THE REST OF THE GROUP EVENT TOKENS" to one or more players visually, or through suitable audio or audiovisual displays, such as community display device 260.

As seen in FIG. 2C, in association with the fifth EGM 202e causing the accumulation of the triple bar symbol group event eligibility unit, the gaming system provides the third progressive award 208c (currently valued at $88.27) to the fifth player of the fifth EGM 202e. Accordingly, the gaming system resets this third progressive award to a reset or base amount of $25.00. In this example, the gaming system provides appropriate messages such as "YOU WON THE SINGLE BAR PROGRESSIVE AWARD OF $88.27" and "NICE WIN" to one or more players visually, or through suitable audio or audiovisual displays.

In certain embodiments, upon each accumulation of each group event eligibility unit (occurring before, after or during the running of the set duration associated with a previously accumulated group event eligibility unit), the gaming system begins to run or lapse the set duration associated with that accumulated group event eligibility unit (i.e., the gaming system initiates another group event eligibility sequence). Accordingly, if a plurality of group event eligibility units are accumulated at different points in time, different durations associated with different accumulated group event eligibility units are concurrently running (and thus different group event eligibility sequences are concurrently occurring). For example, as seen in FIG. 2C, because the double bar symbol group event eligibility unit was accumulated with one minute and eight seconds remaining on the set counter for the accumulated single bar symbol group event eligibility unit, the group event eligibility sequences associated with these two accumulated group event eligibility units will overlap by one minute and eight seconds. Thus, even if one duration associated with one accumulated group event eligibility unit expires (and thus that accumulated group event eligibility unit is eliminated), one or more other durations associated with one or more other accumulated group event eligibility units may be pending with a partially satisfied group event eligibility threshold.

Returning to FIG. 1, if the gaming system determines that the designated quantity of different group eligibility units are currently accumulated, the gaming system enables each player at each EGM associated with a currently accumulated group eligibility unit to participate in a group event as indicated in block 122. The gaming system then provides each participating player with a group event award as indicated in block 124. In this embodiment, if the players concurrently accumulate the designated quantity of the different group event eligibility units within the set duration associated with each of the currently accumulated group event eligibility units, the gaming system enables the players having currently accumulated group event eligibility units to participate in a group event and provides a group event award to such players. That is, if the group event eligibility threshold is reached prior to the durations of each of the currently accumulated group event eligibility units lapsing (and thus prior to such group event eligibility units being eliminated), the gaming system triggers a group bonus event for the players which accumulated such non-eliminated gaming elements.

In one embodiment, the triggered group event is a cooperative group event wherein the participating players work in conjunction with one another, such as by playing together as a team or group, to win one or more group event awards. In one such embodiment, any group event award won by the group is shared, either equally or based on any suitable criteria, amongst the different players of the group. In another embodiment, the triggered group event is a competitive group event wherein the participating players compete against one another for one or more group event awards.

In different embodiments, the play of the group event includes, but is not limited to: a play of any suitable slot group event, a play of any suitable free spins or free activations group event, a play of any suitable wheel group event, a play of any suitable card group event, a play of any suitable offer and acceptance group event, a play of any suitable award ladder group event, a play of any suitable puzzle-type group event, a play of any suitable persistence group event, a play of any suitable selection group event, a play of any suitable cascading symbols group event, a play of any suitable ways to win group event, a play of any suitable scatter pay group event, a play of any suitable coin-pusher group event, a play of any suitable elimination group event, a play of any suitable stacked wilds group event, a play of any suitable trail group event, a play of any suitable bingo group event, a play of any suitable video scratch-off group event, a play of any suitable pick-until-complete group event, a play of any suitable shooting simulation group event, a play of any suitable racing group event, a play of any suitable promotional group event, a play of any suitable high-low group event, a play of any suitable lottery group event, a play of any suitable number selection group event, a play of any suitable dice group event, a play of any suitable skill group event, a play of any suitable auction group event, a play of any suitable reverse-auction group event, a play of any suitable group game or a play of any other suitable type of group event.

In different embodiments, the primary game awards, group event eligibility unit awards, and/or group event awards include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on the internet.

Continuing with the illustrated example, as seen in FIG. 2D, during the duration of the two-minutes associated with the accumulated single bar symbol group eligibility unit, in association with the first EGM 202*a* generating the double bar—double bar—double bar symbol combination, the gaming system accumulates the double bar symbol group event eligibility unit which is illustrated as the double bar symbol group event token 204*b*. Accordingly, the gaming system determines that the single bar symbol group event token 204*a*, the double bar symbol group event token 204*b* and the triple bar symbol group event token 204*c* are each currently accumulated. Based on this determination, the gaming system will trigger a group event for the first player of the first EGM 202*a* (associated with the accumulation of the double bar symbol group event token 204*b*), the third player of the third EGM 202*c* (associated with the accumulation of the single bar symbol group event token 204*a*), and the fifth player of the fifth EGM 202*e* (associated with the accumulation of the triple bar symbol group event token 204*c*). In this example, the gaming system provides appropriate messages such as "PLAYER A ACCUMULATED THE DOUBLE BAR GROUP EVENT TOKEN JUST IN TIME" and "PLAYER A, PLAYER C AND PLAYER E WILL EACH PROCEED TO THE GROUP EVENT" to one or more players visually, or through suitable audio or audiovisual displays, such as community display device 260.

As also seen in FIG. 2D, in association with the first EGM 202*a* causing the accumulation of the double bar symbol group event eligibility unit, the gaming system provides the second progressive award 208*b* (currently valued at $99.96) to the first player of the first EGM 202*a*. Accordingly, the gaming system resets this second progressive award to a reset or base amount of $25.00. In this example, the gaming system provides appropriate messages such as "YOU WON THE DOUBLE BAR PROGRESSIVE AWARD OF $99.96" and "NICE WIN" to one or more players visually, or through suitable audio or audiovisual displays.

As seen in FIG. 2E, for the triggered group event, the gaming system provides part of a group event progressive award 210 (currently valued at $10,364.31 as seen in FIG. 2D) to the first player of the first EGM 202*a* (associated with the accumulation of the double bar symbol group event token 204*b*), the third player of the third EGM 202*c* (associated with the accumulation of the single bar symbol group event token 204*a*), and the fifth player of the fifth EGM 202*e* (associated with the accumulation of the triple bar symbol group event token 204*c*). Following providing this group event progressive award to such players, the gaming system resets this group event progressive award to a reset or base amount of $2,000.00. In this example, the gaming system provides appropriate messages such as "PLAYER A, PLAYER C AND PLAYER E EACH WIN A $3,454.77 PORTION OF THE GROUP EVENT PROGRESSIVE AWARD OF $10,364.31" and "GREAT WIN" to one or more players visually, or through suitable audio or audiovisual displays, such as community display device 260.

In one embodiment, as seen in FIG. 2E, the group event award is shared or split equally amongst each of the players associated with each of the accumulated group event eligibility units. In another embodiment, the group event award is shared or split unequally amongst each of the players associated with each of the accumulated group event eligibility units. In one such embodiment, different group event eligibility units have different probabilities of being accumulated and the gaming system provides the player associated with the accumulation of a group event eligibility unit with a lower probability of being accumulated with a greater portion of the group event award (compared to the portion of the group event award provided to the player associated with the accumulation of a group event eligibility unit with a higher probability of being accumulated).

In one embodiment, as described above, the accumulation of one group event eligibility unit (while the duration associated with another accumulated group event eligibility unit is pending) does not affect any running durations associated with such other currently accumulated group event eligibility units. In another embodiment, the accumulation of one group event eligibility unit (while the duration associated with another accumulated group event eligibility unit is pending) affects the running durations associated with such other currently accumulated group event eligibility units, such as by resetting such durations.

In one embodiment, as described above, each of the designated quantity of group event eligibility units must be concurrently accumulated (i.e., the durations of such group event eligibility units must each overlap at at least one point in time) to trigger the group event. In another embodiment, less than all of the designated quantity of group event eligibility units must be concurrently accumulated to trigger the group event. In one such embodiment, different quantities of concurrently accumulated group event eligibility units are associated with different available group event awards. For example, if a first quantity of group event eligibility units are concurrently accumulated, the gaming system triggers a group event associated with a first group event award and if a second, greater quantity of group event eligibility units are concurrently accumulated, the gaming system triggers a group event associated with a second, greater group event award.

In one embodiment, if one or more players concurrently accumulate a plurality of the same group event eligibility unit, the gaming system enables such player(s) to share any bonus event awards associated with that group event eligibility unit. In one such embodiment, if one or more players concurrently accumulate a plurality of the same group event eligibility unit, the gaming system enables does not affect any running durations associated with this accumulated group event eligibility unit. In another such embodiment, if one or more players concurrently accumulate a plurality of the same group event eligibility unit, the gaming system affects the running durations associated with this accumulated group event eligibility unit, such as by resetting the duration associated with this accumulated group event eligibility unit.

In one embodiment, the gaming system causes at least one display device of the player's EGM to display the group event eligibility sequence and/or group event. In another embodiment, in addition or in alternative to each EGM displaying the group event eligibility sequence and/or group event, the gaming system causes one or more community or overhead display devices to display part or all of the group event eligibility sequence and/or group event to one or more other players or bystanders either at a gaming establishment or viewing over a network, such as the internet. In another embodiment, in addition or in alternative to each EGM displaying the group event eligibility sequence and/or group event, the gaming system causes one or more internet sites to each display the group event eligibility sequence and/or group event such that a player is enabled to log on from a personal web browser. In another such embodiment, the gaming system enables the player to play one or more primary games on one device while viewing the group event eligibility sequence and/or group event from another device. For example, the gaming system enables the player to play one or more primary games on a mobile phone while viewing the status of the group event eligibility sequence and/or group event on a desktop or laptop computer.

In one embodiment, upon an accumulation of one of the plurality of different group event eligibility units (i.e., an initiation of a group event eligibility sequence), the gaming system enables one or more players currently participating in the initiated group event eligibility sequence to invite one or more other players to participate in the initiated group event eligibility sequence. That is, as one or more group event eligibility sequences each include one or more persistence aspects (i.e., based on the duration, one or more of such group event eligibility sequences span across multiple plays of multiple games), this embodiment enables one or more players to invite other players to participate in a partially completed persistence game. Put differently, in such an embodiment, upon an occurrence of a persistence game triggering event, the gaming system triggers a play of a persistence game (wherein the persistence game is associated with a plurality of subsequent plays of the primary games), enables a first player to participate in the play of the triggered persistence game, generates and displays part, but not all, of a persistence game outcome and after displaying the generated part, but not all, of the persistence game outcome, if a player invitation triggering event occurs, enables the first player to invite at least a second player to participate in the play of the triggered persistence game.

In one embodiment, whenever one or more players obtain one or more group event eligibility units, the gaming system enables such players to invite members of their social network to join the initiated group event eligibly sequence associated with the obtained group event eligibility units. In different embodiments, the invitation is automatically broadcast through an automated social media status update, through the sending of one or more SMS, or in response to a player engaging a designated INVITE input device. In another embodiment, the gaming system provides an invitation award to each player that extends an invitation (to participate in a group event eligibility sequence) to one or more other players.

In these embodiments, the players currently participating in the initiated group event eligibility sequence are incentivized to invite one or more other players because the greater the number of players attempting to accumulate group event eligibility units correlates to a greater probability of one or more of such players satisfying the group event eligibility threshold. In these embodiments, the players invited to participate in the initiated group event eligibility sequence are incentivized to accept such invitation because these players would join an in-progress group event eligibility sequence which has partially satisfied the group event eligibility threshold (i.e., less group event eligibility units remaining to be accumulated correlates to a greater probability of one or more of such players fully or completely satisfying the group event eligibility threshold). Such a configuration provides an increased amount of excitement and enjoyment for both the inviting players and the invited players as such players cooperate to try and win one or more group event awards.

In one embodiment, as described above, the gaming system triggers a play of a group event when a designated quantity of different group event eligibility units are currently accumulated. In another embodiment, the gaming system triggers a play of a group event when a designated quantity of the same group event eligibility units are currently accumulated. In another embodiment, the gaming system triggers a play of a group event when a designated quantity of different group event eligibility units are currently accumulated and a designated quantity of the same group event eligibility units are also currently accumulated.

In one embodiment, if a player stops playing a game before the duration associated with one or more accumulated group event eligibility units have expired, the gaming system enables the player to track the status of such group event eligibility units through that player's player account. In one such embodiment, the gaming system enables such a player to collect part of any group event award through that player's player account (or when that player returns to a gaming establishment). In certain embodiments, such features are available to registered player's with an active player account (which incentives certain players to register for a player account to avail themselves of such features).

In one embodiment, if a player stops or ceases being eligible to participate in a group event eligibility sequence, the gaming system eliminates or discards any group event eligibility units accumulated by that player. In one such embodiment, the gaming system eliminates or discards any group event eligibility units accumulated by a player when the player removes a player tracking card. In another embodiment, the gaming system eliminates or discards any group event eligibility units accumulated by a player when that player ceases to make any wagers for a designated period of time. In another embodiment, the gaming system eliminates or discards any group event eligibility units accumulated by a player when the gaming system determines an inactive status associated with that player (i.e., the player ceases to actively play one or more plays of one or more games during a qualification period, such as not placing wagers on plays of primary games at least at a predefined minimum rate during a predefined time period).

In one embodiment, the gaming system extends the duration associated with one or more currently accumulated group event eligibility units. In one such embodiment, the gaming system enables a player to purchase a duration extension associated with one or more currently accumulated group event eligibility units. In another such embodiment, the gaming system enables a player to exchange a quantity of player tracking points for an extension of the duration associated with one or more currently accumulated group event eligibility units. In another embodiment, the gaming system randomly causes an extension of the duration associated with one or more currently accumulated group event eligibility units. In different such embodiments, the gaming system causes such extensions to occur based on one or more displayed events associated with a play of a game or independent of any displayed events associated with any plays of any games. In these embodiments, if a duration extension event occurs (either caused by the gaming system or initiated by a player), the gaming system extends one, a plurality of or each of the durations associated with the currently accumulated group event eligibility units.

In one embodiment, upon an occurrence of a group event eligibility unit accumulation event, the gaming system accumulates one group event eligibility unit associated with one player. In another embodiment, upon an occurrence of a group event eligibility unit accumulation event, the gaming system accumulates one group event eligibility unit associated with each of a plurality of players. In another embodiment, upon an occurrence of a group event eligibility unit accumulation event, the gaming system accumulates a plurality of group event eligibility units associated with one player. In another embodiment, upon an occurrence of a group event eligibility unit accumulation event, the gaming system accumulates a plurality of group event eligibility units associated with a plurality of players.

In one embodiment, the same duration is associated with each accumulated group event eligibility unit. In another embodiment, different durations are associated with each of a plurality of accumulated group event eligibility units. In another embodiment, different durations are associated with each of the accumulated group event eligibility units.

In one embodiment wherein the group event occurs if a designated quantity of the same group event eligibility unit is accumulated, the gaming system associates different durations with at least two of the accumulation occurrences of the same group event eligibility unit. For example, the first time the gaming system accumulates a first group event eligibility unit, the gaming system associates a first duration with that first accumulated first group event eligibility unit. In this example, the second time the gaming system accumulates the first group event eligibility unit (while the first duration is still running), the gaming system associates a second, different duration with that second accumulated first group event eligibility unit.

In one embodiment, the frequency a duration is modified is the same for each accumulated group event eligibility unit. In another embodiment, the frequency a duration is modified is different for each of a plurality of accumulated group event eligibility units. In another embodiment, the frequency a duration is modified is different for each of the accumulated group event eligibility units.

In one embodiment, the designated quantity of accumulated group event eligibility units is the same for each group event. In another embodiment, the designated quantity of accumulated group event eligibility units is different for each of a plurality of group events. In another embodiment, the designated quantity of accumulated group event eligibility units is different for each group event.

It should be appreciated that while the present disclosure is described in respect to accumulating group event eligibility units (such as game elements) for a player, certain of the embodiments described herein may be employed with respect to accumulating group event eligibility units for an EGM. In such embodiments, wherein the identity of a player playing at least one primary game of an EGM is unknown or otherwise anonymous, upon an occurrence of a group event eligibility unit accumulation event, the gaming system accumulates at least one of a plurality of different group event eligibility units for the EGM currently played by that unknown player. Such embodiments provide that both identified and unidentified players may participate in the group event eligibility sequences.

In one embodiment, as described above, a group event eligibility unit accumulation event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a group event eligibility unit accumulation event to occur.

In another embodiment, the gaming system does not provide any apparent reasons to the players for a group event eligibility unit accumulation event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a group event eligibility unit accumulation event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a group event eligibility unit accumulation event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a group event eligibility unit accumulation event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a group event eligibility unit accumulation event occurs, based on a quantity of games played. In this embodiment, a quantity of games played is set for when one or more of such events or conditions will occur. In one embodiment, such a set quantity of games played is based on historic data.

In another alternative embodiment, a group event eligibility unit accumulation event occurs, based on time. In this embodiment, a time is set for when one or more of such events or conditions will occur. In one embodiment, such a set time is based on historic data.

In another alternative embodiment, a group event eligibility unit accumulation event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a group event eligibility unit accumulation event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a group event eligibility unit accumulation event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a group event eligibility unit accumulation event to occur may be implemented in accordance with the gaming system and method disclosed herein.

It should be appreciated that any of the above-described group event eligibility unit accumulation events may be combined in one or more different embodiments.

Alternative Embodiments

It should be appreciated that in different embodiments, one or more of:
i. when a group event eligibility unit accumulation event occurs;
ii. a quantity of group event eligibility units to accumulate upon an occurrence of a group event eligibility unit accumulation event;
iii. a quantity of players (or EGMs) to accumulate one or more group event eligibility units upon an occurrence of a group event eligibility unit accumulation event;
iv. which players (or EGMs) accumulate one or more group event eligibility units upon an occurrence of a group event eligibility unit accumulation event;
v. a duration until expiration associated with each accumulated group event eligibility unit;
vi. a frequency which a duration until expiration association with a group event eligibility unit is modified;
vii. a designated quantity of group event eligibility units to accumulate to trigger a group event;
viii. whether a duration extension event occurs in association with one or more accumulated group event eligibility units;
ix. an amount of any extension of any duration associated with any accumulated group eligibility units;
x. one or more group event eligibility unit awards;
xi. one or more group event awards; and
xii. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

Figure 3A:
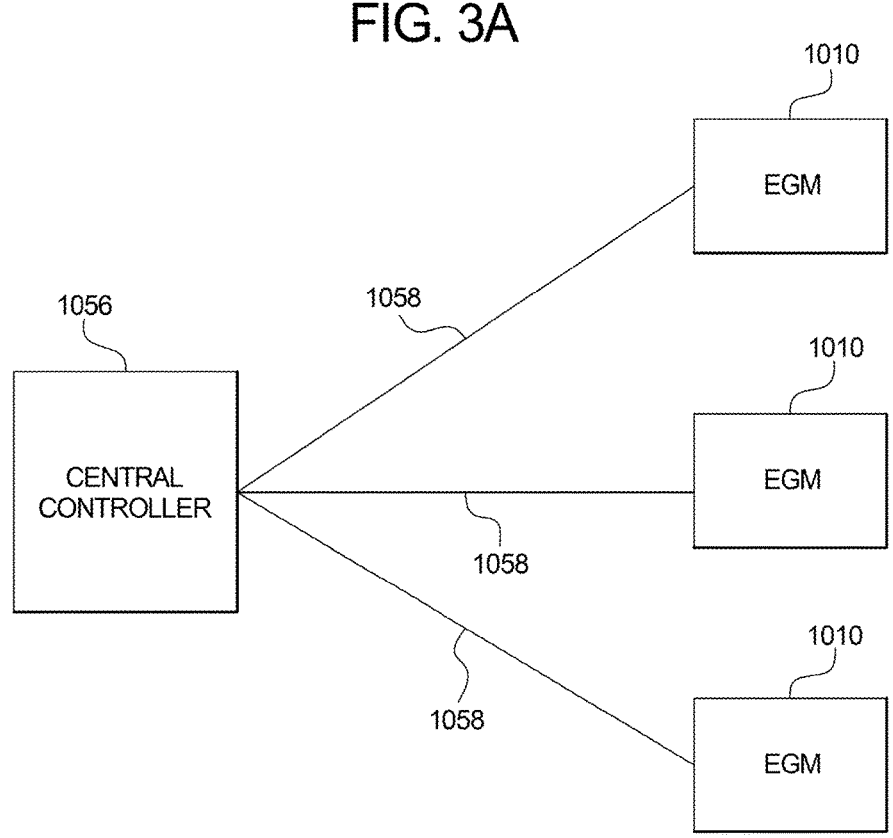
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
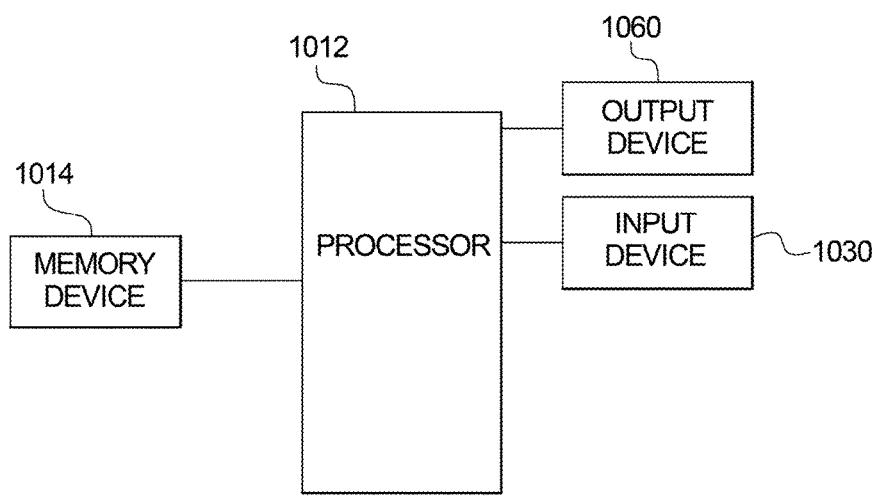
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
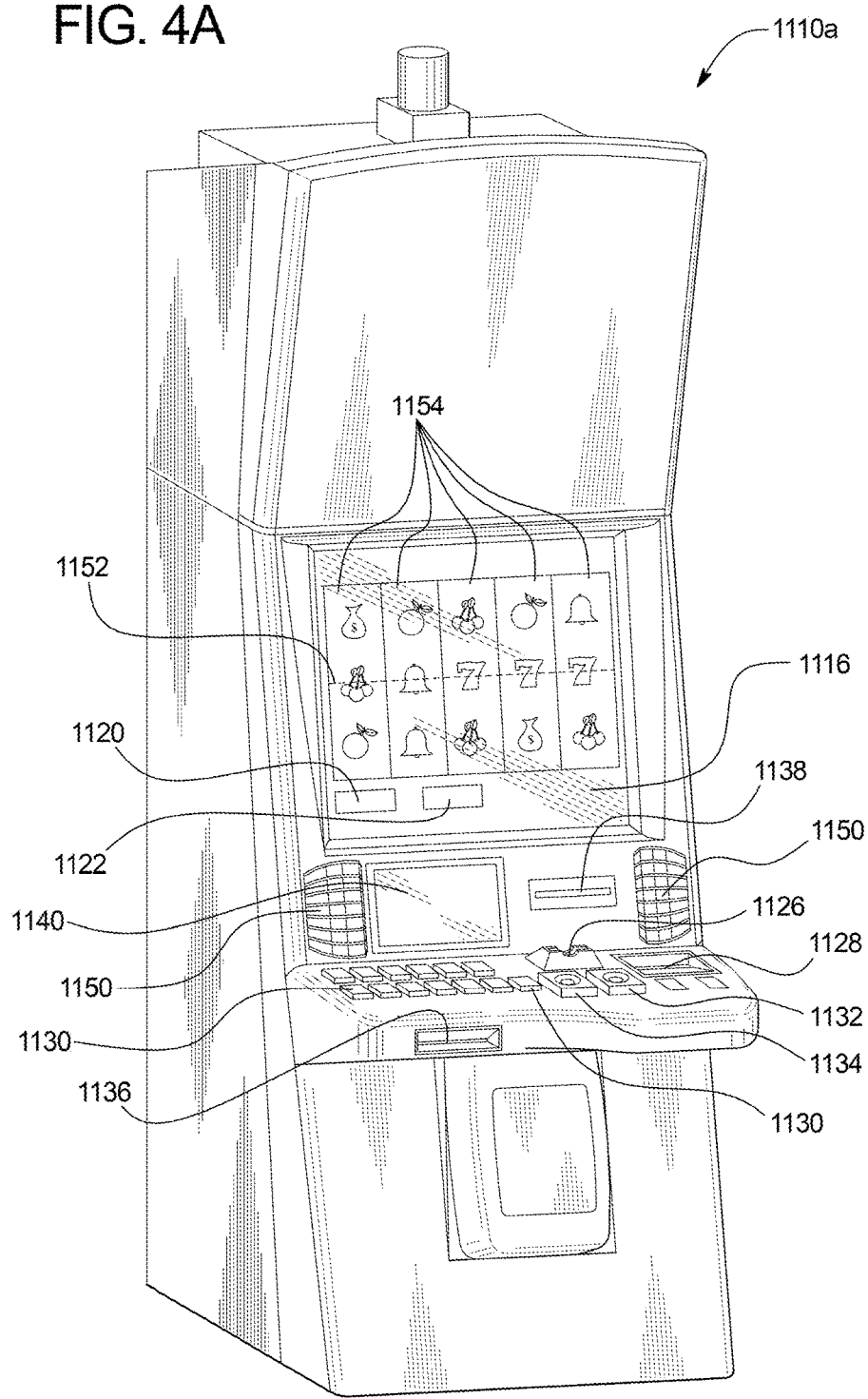
FIGS. 4A and 4B are perspective views of example alternative embodiments of the gaming system disclosed herein.
Figure 4B:
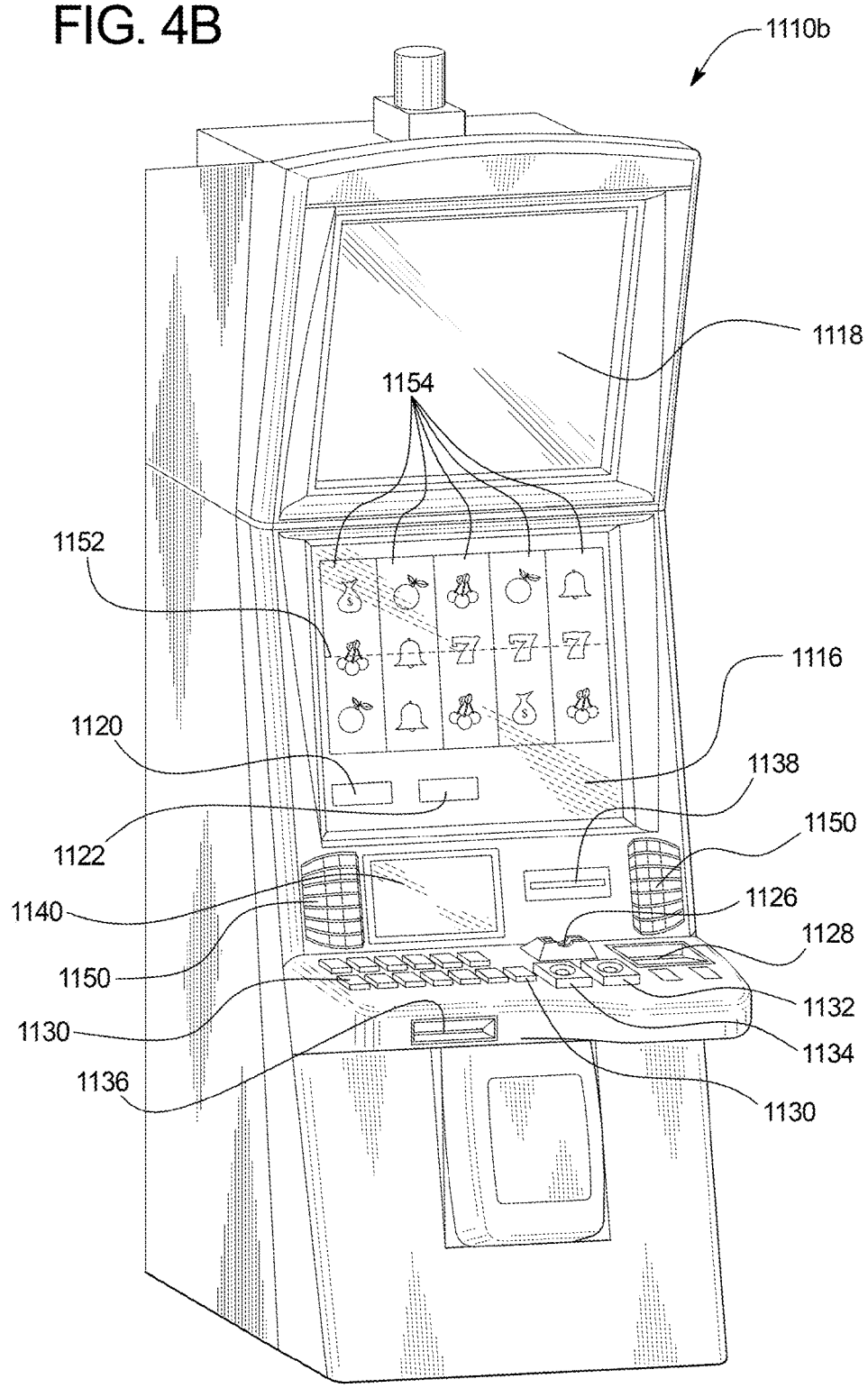

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system server comprising:
a processor, and
a memory device which stores a plurality of instructions, which when executed by the processor upon an occurrence of a persistence game triggering event, cause the processor to:
trigger a play of a persistence game, wherein said persistence game is associated with a plurality of subsequent plays of a plurality of primary games played,
enable a first player to participate in the play of the triggered persistence game,
determine part, but not all, of a persistence game outcome,
cause a display of the determined part, but not all, of the persistence game outcome, and
after causing the display of the determined part, but not all, of the persistence game outcome and responsive to a player invitation triggering event occurring, enable the first player to invite at least a second player to participate in the play of the triggered persistence game.

2. The gaming system server of claim 1, wherein when executed by the processor, the instructions cause the processor to automatically cause the player invitation triggering event to occur when the first player is enabled to participate in the play of the triggered persistence game.

3. The gaming system server of claim 1, wherein when executed by the processor, the instructions cause the processor to enable the second player to accept or decline an invitation to participate in the play of the triggered persistence game.

4. The gaming system server of claim 3, wherein when executed by the processor responsive to at least the second player accepting the invitation to participate in the play of the triggered persistence game, the instructions cause the processor to:
determine a complete persistence game outcome, said complete persistence game outcome based, at least in part, on the determined part, but not all, of the persistence game outcome,
cause a display of the determined complete persistence game outcome,
determine a persistence game award based on the determined complete persistence game outcome, and
cause the determined persistence game award to be provided to at least the first player and the second player.

5. The gaming system server of claim 3, wherein when executed by the processor responsive to at least the second player declining the invitation to participate in the play of the triggered persistence game, the instructions cause the processor to:
determine a complete persistence game outcome, said complete persistence game outcome based, at least in part, on the determined part, but not all, of the persistence game outcome,
cause a display the determined complete persistence game outcome,
determine a persistence game award based on the determined complete persistence game outcome, and
cause the determined persistence game award to be provided to the first player.

6. A gaming system comprising:
a display device,
a processor, and
a memory device which stores a plurality of instructions, which when executed by the processor upon an occurrence of a persistence game triggering event, cause the processor to:
enable a first player to participate in a play of a triggered persistence game, wherein said persistence game is associated with a plurality of subsequent plays of a plurality of primary games played
cause the display device to display a determined part, but not all, of a persistence game outcome, and
after causing the display device to display the determined part, but not all, of the persistence game outcome and responsive to a player invitation triggering event occurring, enable the first player to invite at least a second player to participate in the play of the triggered persistence game.

7. The gaming system of claim 6, wherein when executed by the processor, the instructions cause the processor to automatically cause the player invitation triggering event to occur when the first player is enabled to participate in the play of the triggered persistence game.

8. A method of operating a gaming system server, the method comprising:
upon an occurrence of a persistence game triggering event, triggering, by a processor, a play of a persistence game, wherein said persistence game is associated with a plurality of subsequent plays of a plurality of primary games played, enabling a first player to participate in the play of the triggered persistence game, determining, by the processor, part, but not all, of a persistence game outcome, displaying, by a display device, the determined part, but not all, of the persistence game outcome, and after displaying the determined part, but not all, of the persistence game outcome and responsive to a player invitation triggering event occurring, enabling the first player to invite at least a second player to participate in the play of the triggered persistence game.

9. The method of claim 8, further comprising automatically causing, by the processor, the player invitation triggering event to occur when the first player is enabled to participate in the play of the triggered persistence game.

10. The method of claim 8, further comprising enabling the second player to accept or decline an invitation to participate in the play of the triggered persistence game.

11. The method of claim 10, further comprising, responsive to at least the second player accepting the invitation to participate in the play of the triggered persistence game:

determining, by the processor, a complete persistence game outcome, said complete persistence game outcome based, at least in part, on the determined part, but not all, of the persistence game outcome, displaying, by the display device, the determined complete persistence game outcome, determining, by the processor, a persistence game award based on the determined complete persistence game outcome, and causing the determined persistence game award to be provided to at least the first player and the second player.

12. The method of claim 10, further comprising, responsive to at least the second player declining the invitation to participate in the play of the triggered persistence game:

determining, by the processor, a complete persistence game outcome, said complete persistence game outcome based, at least in part, on the determined part, but not all, of the persistence game outcome, displaying, by the display device, the determined complete persistence game outcome, determining, by the processor, a persistence game award based on the determined complete persistence game outcome, and causing the determined persistence game award to be provided to the first player.

* * * * *